March 15, 1932.  R. M. POTTER  1,849,114

FLUE CONTROL

Filed July 8, 1929  2 Sheets-Sheet 1

INVENTOR
Raymond M. Potter
BY
Frank H. Cent
ATTORNEY

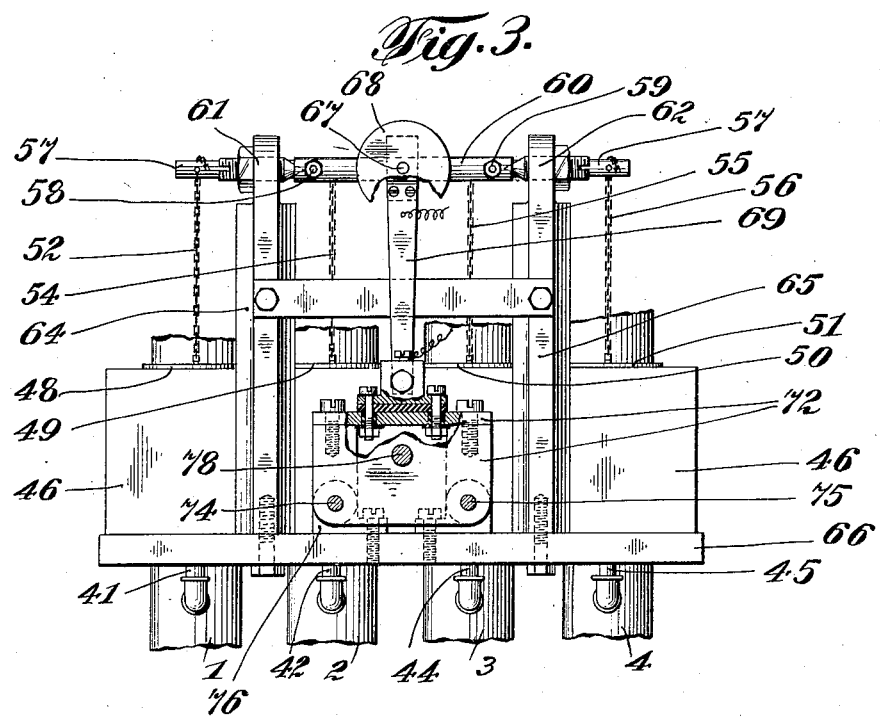
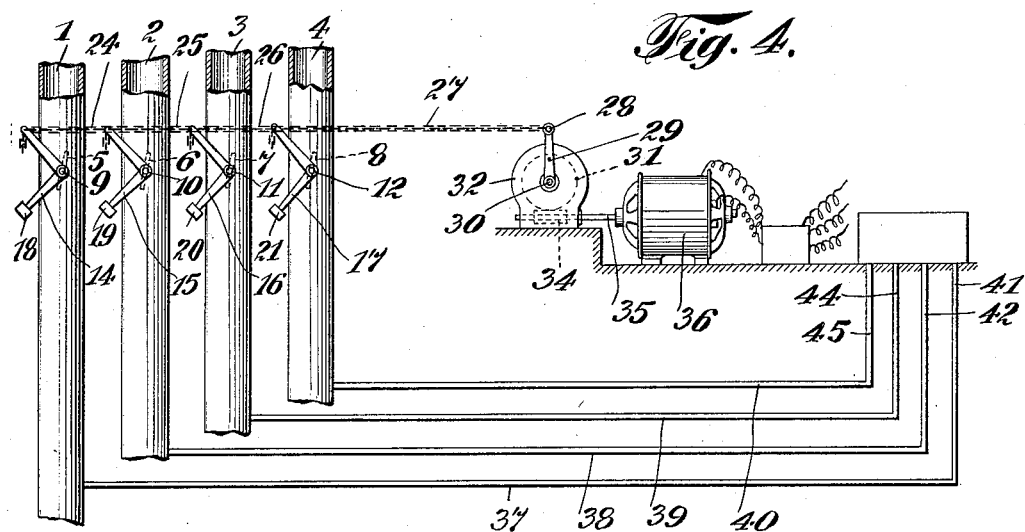

Patented Mar. 15, 1932

1,849,114

UNITED STATES PATENT OFFICE

RAYMOND M. POTTER, OF DOUGLAS, ARIZONA

FLUE CONTROL

Application filed July 8, 1929. Serial No. 376,831.

The present invention relates to the regulation of fluids through conduits or pipes and more especially to the regulation of the draft in a multiplicity of flues of chimneys.

The invention has many places of use and application and more especially in connection with a multiplicity of flues for boilers, furnaces, or industrial devices, in which smoke, gas, or fumes, etc., are emitted from said flues, and wherein it is desirable to control the draft at predetermined levels in each of a multiplicity of flues.

The invention is also of value in the metallurgical arts in connection with the operation of Cottrell treaters where it is necessary to shut down each unit from time to time to remove the dust which has been caught therein.

Other uses and purposes of the present invention will be obvious to those skilled in the art by reference to the following description and the drawings forming a part hereof. The disclosure herewith is to be understood as being a preferred form and also as being illustrative of one form of the invention and therefore is not to be considered in the limiting sense, since the invention may be practiced in other forms as will be appreciated by those skilled in the art.

Throughout the several figures of the drawings, like characters are utilized to designate like parts.

Fig. 3 is an end view of the device shown in Figs. 1 and 2 with a portion thereof broken away to illustrate details of construction.

Fig. 4 is a schematic elevational view where certain views are diagrammatically illustrated.

Figure 1:
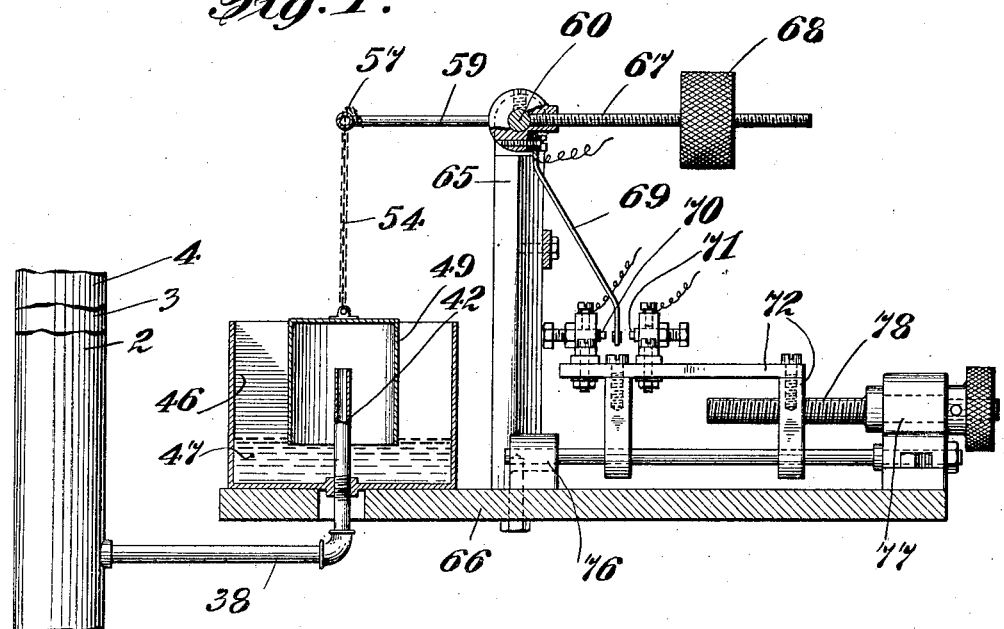
Fig. 1 is an elevational sectional view on line 1—1 of Fig. 2.
Figure 2:
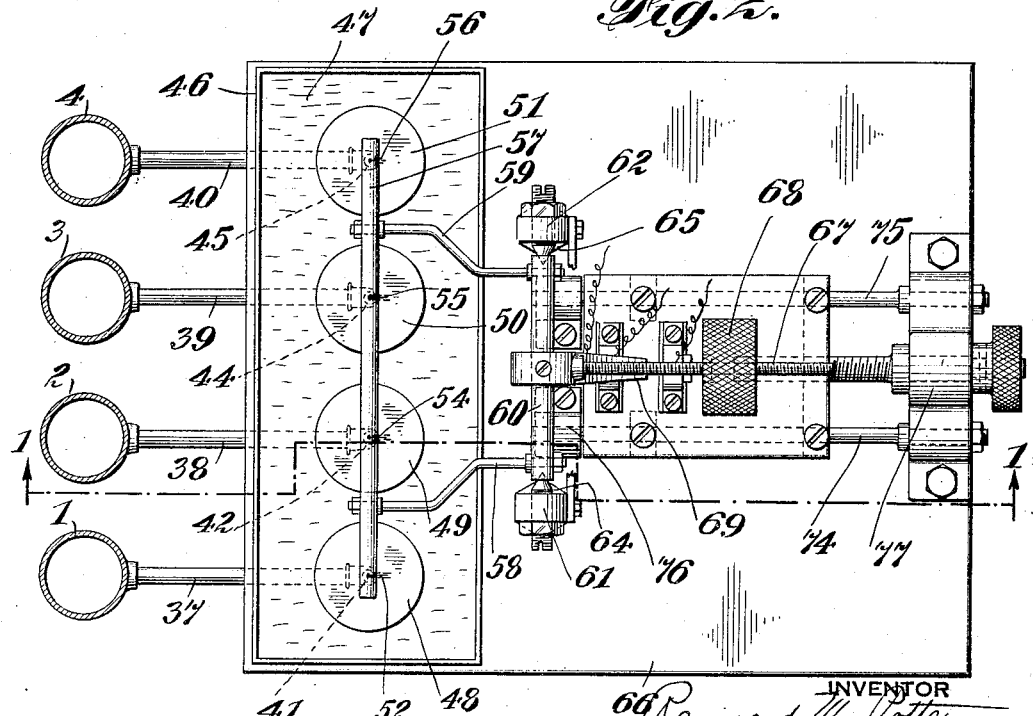
Fig. 2 is a plan view of the device shown in Fig. 1.

Referring now to the drawings and more especially to Figs. 3 and 4 in which are diagrammatically illustrated a plurality of flues 1, 2, 3 and 4, which are shown as being cylindrical, but any suitable form or shape may be used. Each of these flues is provided with a damper 5, 6, 7 and 8, which dampers are so shaped as to act as valves for the flues, and in the present case are shown as being substantially circular. The shafts 9, 10, 11 and 12 upon which these dampers are fixedly mounted carry outside of the flues bellcrank levers 14, 15, 16 and 17. One arm of each of these levers is provided with a counterweight 18, 19, 20 and 21. The other arm of each bellcrank is connected by a chain 24, 25, 26 and 27, or other form of connection, to a post 28 on an arm 29 fixedly secured upon the shaft 30 of a worm wheel 31 suitably mounted in a frame 32, which provides bearings for the shaft 30. The four chains 24, 25, 26 and 27 between the bellcrank lever 17 and the post 28 are in the same horizontal plane, as illustrated in Fig. 4, and therefore appear as a single chain. It is to be understood, however, that preferably there is an individual chain between each bellcrank lever 14, 15, 16 and 17 and the post 28. These chains are each adapted to be lengthened or shortened between the post 28 and their respective bellcrank levers in order that each individual damper may be adjusted relative to the other dampers as to the degree to which the respective flues are normally opened or closed by the said respective dampers, in order that the adjustment of the draft through several flues may be suitably balanced, as a normal adjustment.

The worm wheel 31 is operated by a worm 34 on a shaft 35 of a reversible electric motor 36 so that when the electric motor is driven, the worm 34 turns the worm wheel 31 and the shaft 30, thereby causing the arm 29 to move. If this movement, as illustrated in Fig. 4 is clockwise, the several dampers 5, 6, 7 and 8 through the suitable connections are operated to close the flues 1, 2, 3 and 4. If the motor drive operates to swing the arm 29 counter-clockwise, then the dampers through their connections and under the influence of the counterweights 18, 19, 20 and 21 operate to open the draft through the said flues.

The control of the electric motor is brought about by the following devices. The flues are provided with draft pipes 37, 38, 39 and 40 of a type well known in the art, there being a draft pipe connected with each flue. These draft pipes at their outer open ends terminate in stand pipes 41, 42, 44 and 45, which pass upwardly through the bottom of a liquid container 46, and their upper open ends terminate above the liquid 47 in said container 46. Inverted cups or bells 48, 49, 50 and 51 are suspended over the open ended stand pipes 41, 42, 44 and 45, with the lower ends of these bells extending below the surface of the liquid 47 in the liquid container 46 in such manner as to provide liquid sealed chambers around the open ends of the draft pipes. These inverted cups 48, 49, 50 and 51 are suspended by chains 52, 54, 55 and 56 from a beam 57 carried by arms 58 and 59 mounted upon a shaft 60 which is pivoted on the bearings 61 and 62 carried by vertical uprights 64 and 65 suitably mounted upon a base plate 66. An arm 67 is fixedly secured to the shaft 60 and extends in the opposite direction from the arms 58 and 59. This arm 67 preferably is screw threaded and carries an adjustable counterweight 68. An electric contact arm 69 is carried by the arm 67 and may be suitably insulated therefrom if so desired. This electric contact arm 69 is mounted to oscillate between a pair of adjustable contact points 70 and 71 that are mounted upon and insulated from a carriage 72 which is slidably supported upon guide rods 74 and 75, that are supported in frame blocks 76 and 77. The forward frame block 77 carries an adjustment screw 78 which is mounted to rotate in the frame block 77 and is in screw threaded engagement with the carriage 72. By operating the adjustment screw 78, the carriage 72 may be moved to and fro on the guide rods 74 and 75 thereby changing the relation of the adjustable contact points 70 and 71 to the contact end of the arm 69. These contact points are suitably electrically connected with the reversible electric motor 36 in such manner that when the contact arm 69 contacts with the contact point 70, an electrical current flows through these parts to the electric motor so as to cause the electric motor to be driven in one direction, and when the contact arm contacts with the point 71, an electric current flowing through these connections causes the electric motor to be driven in the opposite direction.

The dampers are adjustably set in such manner as to normally provide the desired draft through the several flues by lengthening or shortening the individual chains. If the draft increases in one or more of the said flues, the pressure conditions beneath the inverted cups changes and this causes the cups to move. This, through the connected parts, brings the contact arm 69 into engagement with the contact point which will cause the electrical motor to operate and through the connected parts to gradually swing the dampers to cut down the draft through the flues. This brings about a gradual change in the pressure conditions under the cups and through connected parts causes the contact arm 69 to break the connection with the contact point, thereby leaving the dampers set at such position as to provide normal draft under the changed conditions which tended to bring about the increased draft. If on the other hand, the draft in one or more of the flues decreases, again pressure conditions change in the opposite direction under the cups and through connected parts, the contact arm 69 is brought into engagement with the other contact point which causes a current to flow through the electric motor to operate the damper controls in such manner as to gradually open the dampers, thus tending to increase the draft through the flues, and thereby again gradually changing pressure conditions under the cups so that the contact arm breaks the circuit and stands in neutral condition between the contact points where the dampers are left until there is a further adjustment required.

From the foregoing, it will be observed that the draft conditions determined as normal may be set at the will of the operator and these conditions will be maintained automatically until a resetting is made. By adjusting the lengths of the chains to the dampers normal relative adjustment of the dampers is obtained; by adjusting the counterweight 68 on the arm 67, the sensitivity of the device may be changed; and by adjusting the carriage 72, the predetermined draft through the several flues may be increased or decreased at the will of the operartor. From the foregoing, it will be observed that the present device is very flexible in its adjustments and operations and when once set, automatically maintain predetermined conditions.

I claim:

1. A device for regulating the flow of fluids through a plurality of independent conduits, comprising in combination a plurality of conduits, valves within said conduits and being operable to restrict the flow of fluids through said conduits, a common operating means for said valves, adjustable connections between said valves and said means, and automatic devices controlled by the flow of fluids through said conduits to operate said operating means to maintain the flow of fluids through said conduits within predetermined limits.

2. A device for regulating the flow of fluids through a plurality of independent conduits, comprising in combination a plurality of conduits, valves being operable to restrict the flow of fluids through said conduits, operating means for said valves, connections between said valves and said means, and a common control device for a plurality of said valves actuated by the flow of fluids through said conduits to operate said operating means to maintain the flow of fluids through said conduits within predetermined limits.

3. A device for regulating the flow of fluids through a plurality of independent conduits, comprising in combination a plurality of conduits, valves within said conduits and being operable to restrict the flow of fluids through said conduits, a common operating means for said valves, adjustable connections between said valves and said means, automatic devices controlled by the flow of fluids through said conduits to operate said operating means to maintain the flow of fluids through said conduits within predetermined limits, and adjustable means for changing said limits.

4. A device of the class described comprising in combination a plurality of flues, a damper within each flue, operating means for said dampers, and common control means directly operable by the pressure of the fluids in said flues to control the operation of said operating means to maintain the flow of fluids through said flues within predetermined limits.

5. A device of the class described comprising in combination a plurality of flues, a damper within each flue, and common means directly operable by the flow of fluids through said flues to simultaneously control the operation of a plurality of said dampers to maintain the flow of fluids through said flues within predetermined limits.

6. A device of the class described comprising in combination a plurality of flues, a damper within each flue, common control means directly operable by the combined effect of the pressures in said flues to control the simultaneous operation of said dampers to maintain the flow of fluids through said flues within predetermined limits, and adjustable devices to simultaneously predetermine the normal flow of fluids through said flues.

7. A device of the class described comprising in combination a plurality of flues, dampers for said flues, common operating means for said dampers, draft pipes connected with said flues, and control means operated by the combined pressure conditions in said draft pipes to control said common operating means to maintain the draft in said flues within predetermined limits.

8. A device of the class described comprising in combination a plurality of flues, dampers for said flues, operating means for said dampers, draft pipes connected with said flues, common control means operated by the combined effect of the pressure conditions in said draft pipes to control said operating means to maintain the draft in said flues within predetermined limits, and means to adjust said limits.

9. An automatic damper regulator comprising a plurality of flues, a damper for each flue, common operating means to simultaneously operate said dampers, means for adjusting the normal setting of each of said dampers, common control means under control of the draft in said flues for operating said operating means, and adjustable devices for said control means to determine the normal draft through said flues.

10. An automatic damper regulator comprising a plurality of flues, a damper for each flue, operating means to operate said dampers, common control means under control of the draft in said flues for operating said operating means, and adjustable devices for said common control means to determine the normal draft through said flues.

11. An automatic damper regulator comprising a plurality of flues, a damper for each flue, power means to operate said dampers, means for adjusting the normal setting of each of said dampers, control means under control of the combined draft in all of said flues for operating said operating means, and adjustable devices for said control means to determine the normal combined draft through all of said flues.

12. A device of the class described comprising a flue, a damper for said flue, a draft pipe leading from said flue, a container for liquid and with an open end of said draft pipe terminating above the liquid in said container, a movable cup suspended over the open end of said draft pipe, a contact member controlled by the movement of said cup, a pair of contacts with which said contact member operates, a reversible electric motor operatively connected with said contacts, and gear mechanism connecting said motor with said damper to enable the operation of said damper to be controlled by the draft in said flue.

13. A device of the class described comprising a flue, a damper for said flue, a draft pipe leading from said flue, a container for liquid and with an open end of said draft pipe terminating above the liquid in said container, a movable cup suspended over the open end of said draft pipe and dipping into said liquid to form a liquid sealed chamber, a contact member controlled by the movement of said cup, a pair of contacts with which said contact member operates, and means to permit adjustment of said contacts relatively to each other.

In testimony whereof I affix my signature.

RAYMOND M. POTTER.